UNITED STATES PATENT OFFICE.

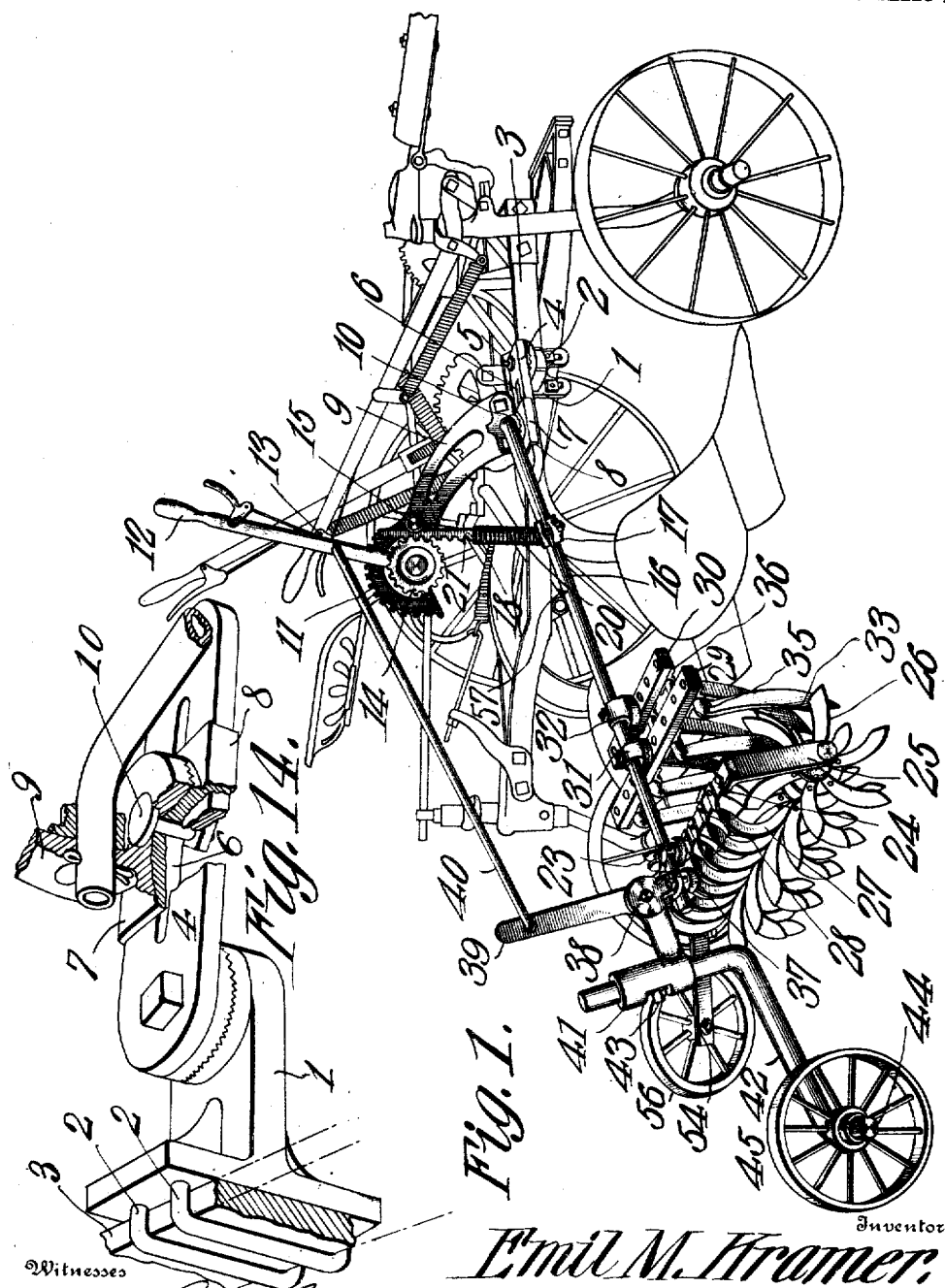

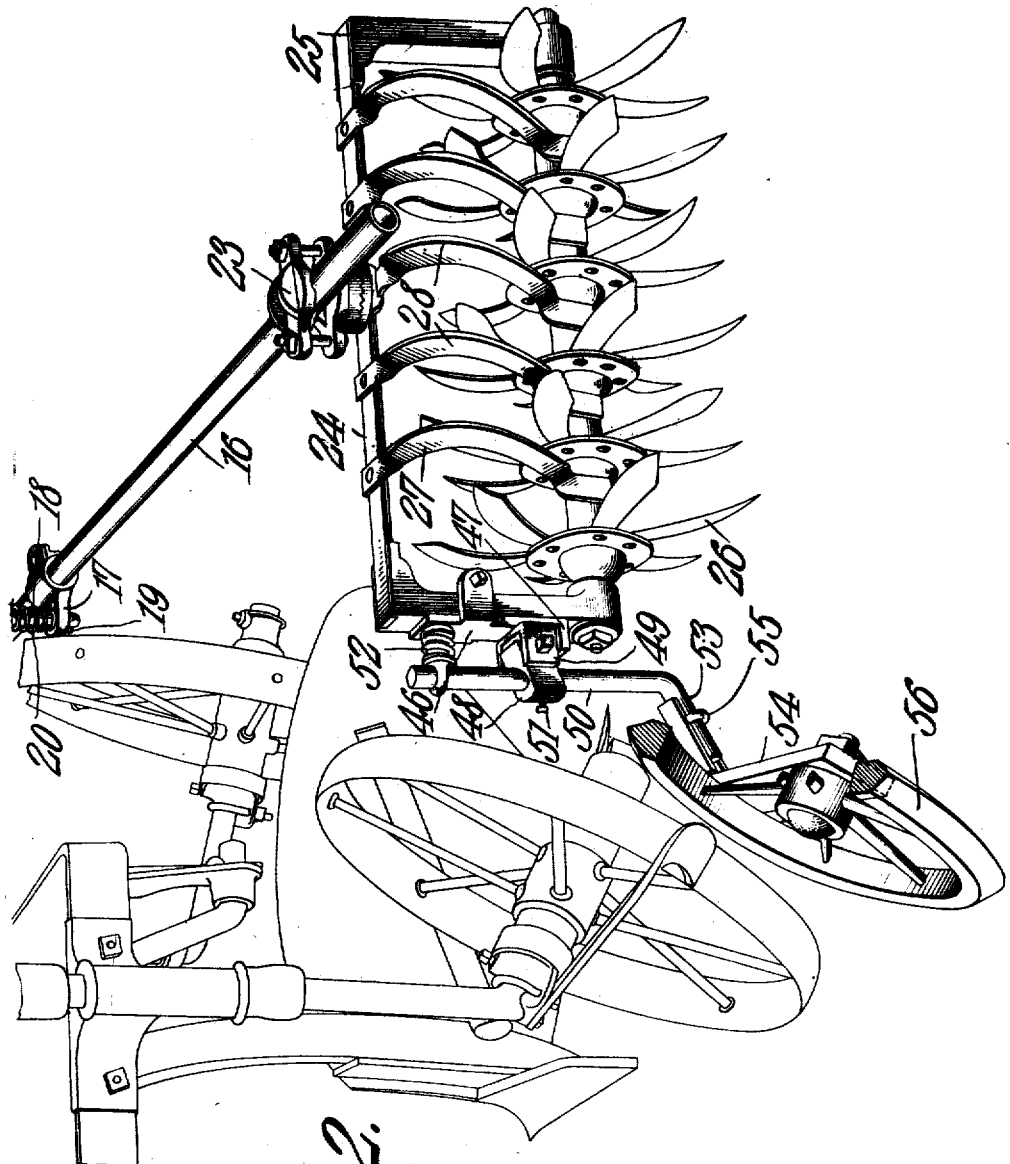

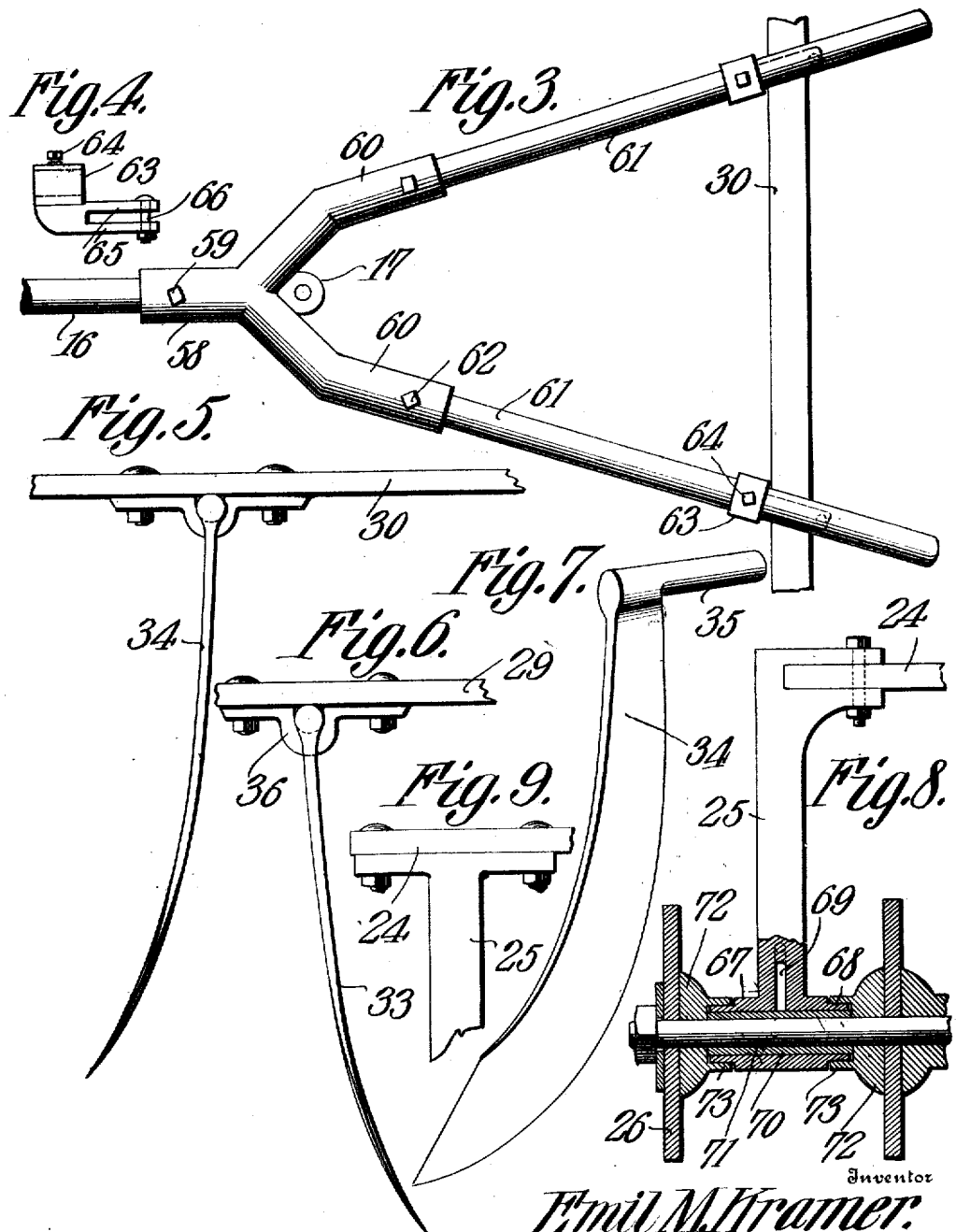

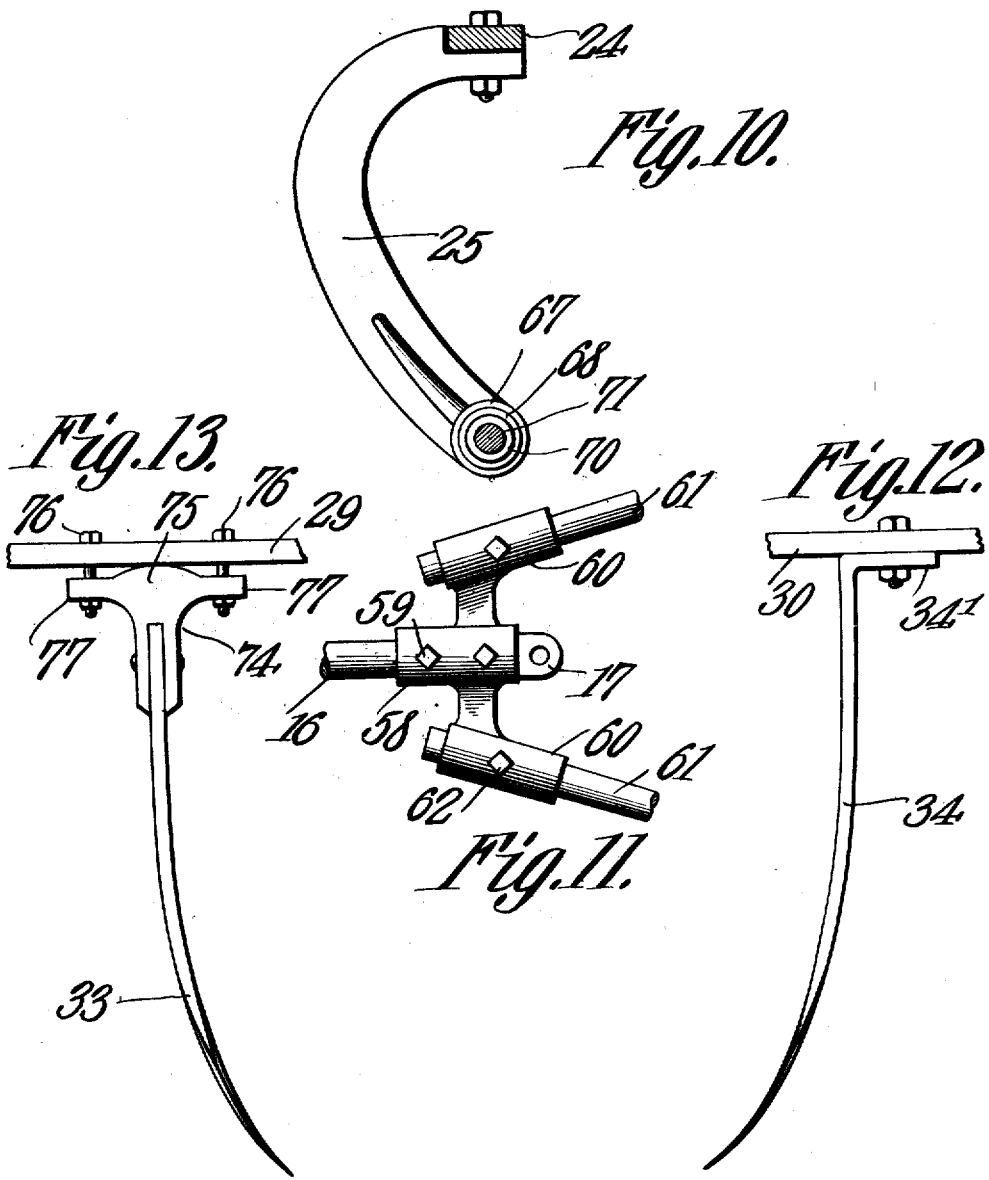

EMIL M. KRAMER, OF PAXTON, ILLINOIS.

SOIL-PULVERIZING ATTACHMENT FOR PLOWS.

No. 913,216.  Specification of Letters Patent.  Patented Feb. 23, 1909.

Application filed March 7, 1908. Serial No. 419,795.

*To all whom it may concern:*

Be it known that I, EMIL M. KRAMER, a citizen of the United States, residing at Paxton, in the county of Ford and State of Illinois, have invented a new and useful Soil-Pulverizing Attachment for Plows, of which the following is a specification.

This invention has relation to soil pulverizing attachments for plows and it consists in the novel construction and arrangement of its parts as hereinafter shown and described.

The object of the invention is to provide an attachment of the character indicated which consists primarily of an attaching means with various adjustments and to which is connected a pulverizer having a series or gang of rotating soil pulverizing members. Means is also provided for adjusting the pitch or angle of the pulverizer with relation to the line of draft. In the preferred form of the invention oppositely disposed soil cleaving blades are mounted in advance of the pulverizer and are adapted to reduce the larger clods to smaller dimension in order that they may be effectually operated upon by the pulverizer in reducing them to a mulch.

A further object of the invention is to provide means for preventing the pulverizer from having a tendency to move or work toward the landside of the furrow when in operation.

A still further object of the invention is to provide means for raising the pulverizer above the surface of the soil and for simultaneously supporting the same through the instrumentality of a trailing wheel and gear in order that turns may be readily made and that an implement with the attachment applied may be conveyed from place to place.

The invention also includes various details and modified arrangements as will be particularly pointed out in the subjoined description and in connection with the drawings.

In the accompanying drawings: Figure 1 is a perspective view looking at the side of a plow with the attachment applied thereto. Fig. 2 is a perspective view of the rear portion of a plow with the attachment applied thereto and parts thereof removed. Fig. 3 is a plan view of a modified form of pulverizer supporting arm used in the attachment. Fig. 4 is a side elevation of means for clamping the supporting bar of the pulverizer to the form of arm as shown in Fig. 3. Fig. 5 is an edge elevation of one of the cleaving blades which is disposed in one direction. Fig. 6 is an edge elevation of one of the cleaving blades disposed in the opposite direction. Fig. 7 is a perspective view of one of the cleaving blades detached. Fig. 8 is a side elevation partly in section of one form of standard which may be used upon the pulverizer. Fig. 9 is a side elevation of the upper portion of another form of standard which may be used on the pulverizer. Fig. 10 is a side elevation of a modified form of standard used upon the attachment. Fig. 11 is a plan view of still another form of pulverizer supporting arm for the attachment. Fig. 12 is an edge elevation of another modified form of cleaving blade, and Fig. 13 is an edge elevation of still another modified form of cleaving blade. Fig. 14 is a perspective, with parts broken away, showing how an arm used in the attachment is pivotally connected with a supporting means.

The attachment consists of the bracket 1 which is adapted to be adjustably secured by means of the clamp bolts 2 at any desired point along the length of the side rail 3 of the frame of the plow or other implement to which the said attachment may be applied. The shelf piece 4 is mounted upon the bracket 1 and may be adjusted about an axis thereon and secured in an adjusted position by the clamp bolt 5 which passes transversely through the said bracket and the said shelf piece. The shelf piece 4 is provided with an elongated slot 6. The block 7 is arranged to slide longitudinally along the shelf piece 4 and is provided at its edges with the depending flanges 8 which receive the edges of the shelf piece 4. The post 9 is mounted upon the block 7 and may be turned axially thereon and secured in an adjusted position by means of the clamp bolt 10 which passes transversely through the base of the said post 9, the block 7 and the slot 6 and which clamp the said post 9 and block 7 in position upon the shelf piece 4. The upper end of the post 9 is provided with a segment gear 11. The lever 12 is fulcrumed to the upper portion of the post 9 and is provided with a pawl mechanism 13 adapted to engage the segment 11. The lower end of the lever 12 is formed into a gear pinion 14 which is concentric with relation to the fulcrum point of the said lever. The guide or friction roller is journaled upon the side of the post 9. The arm 16 is journaled at its forward end in the base of the post 9 and is adapted to swing vertically or in a plane parallel with that occupied by the said post.

The lug 17 is adjustably mounted upon the arm 16 and the lower end of the rack bar 18 passes through the lug 17 and is provided at a point below the said lug with a cotter pin 19, as shown in Fig. 2, or other means may be provided for limiting the longitudinal movement of the said bar with relation to the said lug. The coil spring 20 is interposed between a shoulder carried by the bar 18 and the upper surface of the lug 17. Said spring is under tension with a tendency to hold the cotter pin 19 against the lower side of the lug 17. The upper portion of the bar 18 lies between the peripheries of the pinion 14 and the roller 15 and is provided with teeth 21 which mesh with the pinion 14.

From the foregoing description it is obvious that the bracket 1 may be applied at any desired point fore or aft along the side rail 3 of the implement. It will also be seen that by swinging the shelf piece 4 horizontally and securing the same that the forward end of the arm 16 may be moved and held toward or away from the side of the implement. Also, that by shifting the block 7 along the shelf piece 4 the lateral adjustment of the forward end of the arm 16 may be augmented or the position of the said arm with relation to the side of the implement may be readily adjusted to a nicety. It will also be seen that by turning the post 9 axially or upon the pivot at its base that the arm 16 may be pitched at any desired angle with relation to the line of draft. Again by adjusting the lug 17 along the arm 16 the weight of the load carried by the rear end of the said arm may be more easily raised or lowered. The spring 20 always has a tendency to hold the arm 16 down so far as the cotter pin 19 in the bar 18 and the lug 17 will permit. Thus it will be seen that a multiplicity of adjustments is provided in order to properly position the parts with relation to each other and the attachment as a whole upon the implement and also to have the arm properly disposed with relation to the line of draft. The great variety of adjustments also enables the attachment to be applied to implements which differ in configuration of frame or which have projecting parts as the parts of the attachment may be so positioned with relation to each other as to engage with the frame of any pattern of implement irrespective of its projections in that the parts of the attachment may be passed around or between the projections mounted upon the implement frame. In other words the attachment is designed to be applied to implements having any particular or usual configuration or design of frame.

The soil pulverizer is adjustably attached to the rear end portion of the arm 16 by means of the clamp plates 23. The bar 24 is pivotally connected with the lower clamp plate 23 and may be swung with relation thereto and secured in a desired position. The standards 25 depend from the bar 24 and the soil pulverizing members are mounted for rotation below the bar 24 and between the standards 25. The said pulverizing members may be blades or knives as illustrated in the drawings or they may be disks. By swinging the bar 24 horizontally upon its pivotal connection with the lower clamp plate 23 and securing the same the angle of pitch or inclination of the pulverizing members may be adjusted with relation to the line of draft of the implement. The fender ribs 27 are carried by the pulverizer 22 and are designed to keep the pulverizing members free from the collection of trash, etc. Said ribs are attached at their upper ends to the bar 24 and bear at their lower ends against the axle upon which the members 26 are mounted and are twisted and rearwardly bowed at intermediate portions as at 28 which said twisted portions lie parallel with the paths described by the said pulverizing members and by reason of their length and bowed configuration will engage trash which is impaled or picked up by the pulverizing members and force the same off of and away from the said members.

The bars 29 and 30 are located in advance of the bar 24 and are adjustably mounted upon the arms 16 by means of the sleeves 31 and 32 or their equivalents. The said bars 29 and 30 are pivotally connected with the said sleeves and may be swung horizontally and secured in any desired position with relation thereto. The soil cleaving blades 33 depend from the bar 29 and the soil cleaving blades 34 depend from the bar 30. The blades 33 and 34 are rearwardly and laterally curved toward their lower ends but the lateral curvature of the blades 33 is opposite to that of the blade 34. The said blades are provided at their upper ends with forwardly disposed shanks 35 which are held by the clamp plates 36 in close contact against the under sides of the bars and by means of which the angle of inclination in lateral directions of the said blade may be readily adjusted.

The clamp plates 37 are adjustably mounted upon the rear end portion of the arm 16 behind the plates 23. The lug 38 is mounted upon the upper clamp plate 37 and the bell crank rocker arm 39 is pivotally connected with the said lug 38. The pitman 40 pivotally connects the upper end of the arm 29 with the lever 12. The rear end of the arm 39 is provided with a substantially vertically disposed bearing 41 in which is journaled the forward end of the arm 42. The rotary movement of the arm 42 in the bearing 41 is limited by means of a pin 43 attached to the arm 42 and which passes through an opening provided in the side of the bearing 41. The forward portion of the arm 42 is substantially vertically disposed while the rear portion thereof is substantially horizontally disposed and forms a spindle 44 upon which the ground wheel 45 is journaled for rotation.

It will be seen that when the lever 12 is swung toward the rear the pitman 11 will be moved longitudinally which in turn will swing the rocker arm 39 upon its pivot so that the rear end thereof will descend. Consequently, the arm 42 is lowered and the ground wheel 45 is forced against the surface of the ground. At the same time the pinion 14 in engagement with the teeth 21 of the bar 18 will move the said bar longitudinally and in a vertical direction which through the cotter pin 19 and lug 17 will cause the rear end of the arm 16 to swing up so that the soil cleaving blades and pulverizing elements are raised above the surface of the soil. When the lever 12 is swung in a forward direction the operation above described is reversed. Thus it will be seen that means is provided for simultaneously raising the soil engaging elements as the supporting wheel descends and vice versa and that one lever is so connected with these parts as to simultaneously operate them.

When the attachment is in operation upon the surface of the soil it is lowered into engagement with the same and the ground wheel 45 is raised. When making a turn at the end of a furrow the pulverizing elements are raised and the ground wheel is lowered.

When the implement is traveling from place to place with the attachment applied the ground wheel is lowered and serves as a support for the attachment preventing the same from having undue vibration.

The bracket 46 is adjustably mounted upon the standard 25 which is nearest the implement to which the attachment is applied. The lower end of the said bracket is provided with an outstanding lug 47. The block 48 is pivotally mounted between the lugs 49 attached to the bracket 46. The arm 50 passes through the block 48 and may be adjusted therein both longitudinally and axially and secured in an adjusted position by means of the set screw 51 which passes through the said block. The coil spring 52 is interposed between the upper portion of the bracket 46 and the arm 50 and is under tension with a tendency to hold the upper ends of the said bracket and arm apart. The lower portion of the arm 50 is laterally disposed as at 53 and has sliding connection with the arm 54 and may be fixed with relation thereto by means of the clamp bolt 55. The wheel 56 is journaled for rotation at the rear end of the arm 54 and is adapted to travel immediately behind the rear furrow wheel of the implement and in contact with the angle formed at the intersection of the bottom and side of the furrow.

The wheel 56 and the arms 54, 50 and bracket 46 are designed to prevent the pulverizer 22 from having a tendency to move laterally toward the landside of the furrow as it would have in the absence of these parts by reason of the fact that the pulverizing elements are pitched at an angle to the line of draft and are converged at their forward sides toward the landside of the furrow. By this means rigidity is added to the pulverizer when in operation.

By shifting the bracket 46 along the standard 25 the wheel 54 may be raised or lowered to operate in a shallow or deep furrow and the vertical adjustment of the wheel 56 may be effected to a nicety through the adjustable connection of the arm 50 with the block 48. The wheel 56 may be shifted laterally so as to properly engage the sides of the furrow and track or furrow behind the rear wheel of the implement by means of the sliding connection between the arms 53 and 54 and the clamp bolt 55. By reason of the fact that the block 48 is pivotally mounted between the lugs 49 there is a certain amount of hinge movement between the soil pulverizer and the wheel 56 which is resisted by the coil spring 52 but which is sufficient to render the attachment sufficiently flexible to ride over obstructions without danger of damage or excessive jarring. The hinge movement between the said parts is limited by the lug 47 formed at the lower end of the bracket 46 and which may be engaged by the block 48 or arm 50 when the pulverizer and the wheel 56 attempt to have an excessive hinge movement with relation to each other.

Fig. 3 of the drawing shows a modified form of the arm 16. This arm is especially adapted to be used when it is desired that the outer end portions of the bars 24, 29 and 30 shall not rock in opposite directions. That is to say, if there is any vertical movement of the said parts it shall be uniform throughout and not with one end of the part ascending while the other end thereof is descending. In this form of the invention the arm 16 proper is very short or what is generally termed a stub extending from its forward end to about the point indicated by the arrow 57 in Fig. 1. The said stub 16 fits into the sleeve 58 and is secured therein by means of the set screw 59. The tubular branches 60 connect with the sleeve 58 and are pitched at an angle to each other with their rear ends diverging. The arms 61 are fitted in to the rear ends of the branches 60 and are held therein by means of the set screws 62. Thus the rear portions of the arm 61 diverge. The sleeves 63 are slidably mounted upon the arms 61 and may be secured in an adjusted position by means of the set screws 64. The lower portions of the sleeves 63 are provided with parallel jaws 65 which are adapted to receive between them the bars 30, 29 or 24 and which are held therein by means of the bolts 66. It is of course understood that two sleeves 63 are required for each of the said bars they being applied one at each end of the said bars. It is obvious that by shifting the sleeves 63 along the arms 61 out of transverse alinement with each other the said bars may be pitched at any desired angle with relation to the line of draft.

Fig. 8 illustrates a modified form of standard 25. In this form of standard the lower end thereof may be connected with the axle upon which the pulverizing members are mounted at points between the said members. This is desirable in some cases especially where the pulverizer is long and should need bracing at its middle. In the said form the lower end of the standard 25 is provided with a bearing 67 which is provided at its ends with the bosses 68. The oil hole 69 passes through the said bearing. The sleeve 70 is located in the bearing and surrounds the axle rod 71. The washers 72 are provided with annular flanges 73 which receive the bosses 68 and which bear against the sides of the pulverizing members 26 or their equivalents. Thus the flanges 73 form dust guards at the ends of the bearing while at the same time an adequate support for the intermediate portion of the axle is provided.

At the upper ends of the standards shown in Figs. 8 and 9 two different or modified forms of means for connecting the standards with the bars 24 are illustrated.

The form of standard as shown in Fig. 10 is curved or bowed rearwardly to conform to the general shape of the intermediate bowed portions of the ribs 27. Thus the said standard serves as a support and a fender.

In the form of blade as shown in Fig. 12 the shank 35 is dispensed with and the upper end of the blade is provided with a laterally disposed portion 34' which is bolted to the bar 30.

In the form of blade as shown in Fig. 13, the upper end of the blade 33 fits in the lower portion of the block 74. The block is provided upon its upper side with a rounded portion 75 which bears against the under side of the bar 29. The bolts 76 pass transversely through the bar 29 and the lugs 77 at the sides of the block 74 and may be adjusted so that the slant of the blade 33 with relation to the bar 29 may be pitched at a desired angle.

In the form of arm connecting means as shown in Fig. 11, the sleeve 58 is spaced from the branches 60 and the said branches 60 are open at both ends so that the arms 61 may be adjusted longitudinally therein to any desired extent.

Having described my invention, what I claim as new and desire to secure by Letters Patent is:

1. An attachment as described comprising a post, means for attaching the same to a frame, an arm pivotally connected with the post, a lever fulcrumed upon the post, means operatively connecting the lever with the arm, a soil-engaging member carried by the arm, a rocker pivotally mounted upon the arm to swing vertically, means operatively connecting one end of the rocker with the lever and a supporting wheel attached to the rocker.

2. An attachment as described comprising a swinging arm, a soil engaging member attached thereto, an arm attached to said member and being vertically adjustable thereon, said arm also being longitudinally extensible and a wheel journaled upon the arm and adapted to engage the landside of a furrow.

3. An attachment as described comprising a swinging arm, a soil engaging member attached thereto, a vertically adjustable bracket mounted upon said member, an arm hingedly connected with said bracket and a wheel journaled upon the arm and adapted to engage the landside of a furrow.

4. An attachment as described comprising a swinging arm, a soil engaging member attached thereto, a bracket adjustably mounted upon said member, an arm hingedly connected with said bracket, a spring interposed between said arm and said bracket and a wheel journaled upon said arm and adapted to engage the landside of a furrow.

5. An attachment as described comprising a swinging arm, a soil engaging member attached thereto, a bracket adjustably mounted upon said member, a block pivotally connected with the bracket, an arm slidably and rotatably mounted in said block and a wheel journaled to said arm and adapted to engage the landside of a furrow.

6. An attachment as described comprising a swinging arm, an earth engaging member adjustably mounted thereon, bars located in advance of said member and being connected with the arm and adapted to be adjusted longitudinally thereof and at an angle with relation thereto, cleaving blades attached to said bars, the blades being curved, the blades upon one bar being disposed laterally in an opposite direction to the blades upon the other bar.

7. An attachment as described comprising a swinging arm, a sleeve attached thereto and having diverging rearwardly disposed tubular portions, diverging arms attached to said portions, sleeves adjustably mounted upon the last said arms and having jaws, a bar located in the said jaws, and an earth engaging member carried by the bar.

In testimony that I claim the foregoing as my own, I have hereto affixed my signature in the presence of two witnesses.

EMIL M. KRAMER

Witnesses:
JOHN W. KAUFMANN,
J. H. NELSON.